United States Patent [19]
Murphy et al.

[11] Patent Number: 6,021,240
[45] Date of Patent: Feb. 1, 2000

[54] OPTICAL SENSOR ACTIVATION DEVICE

[75] Inventors: Kent A. Murphy, Troutville; Mark E. Jones, Blacksburg, both of Va.

[73] Assignee: F&S, Inc., Blacksburg, Va.

[21] Appl. No.: 08/942,927

[22] Filed: Oct. 2, 1997

[51] Int. Cl.$^7$ .................................................. G02B 6/34
[52] U.S. Cl. .......................... 385/37; 250/227.14; 385/12
[58] Field of Search ................................. 385/12, 13, 37; 250/227.14

[56] References Cited

U.S. PATENT DOCUMENTS

| | | |
|---|---|---|
| 4,844,613 | 7/1989 | Batchelder et al. . |
| 4,929,049 | 5/1990 | Goullon et al. . |
| 5,026,139 | 6/1991 | Klainer et al. . |
| 5,064,619 | 11/1991 | Finlan . |
| 5,067,788 | 11/1991 | Jannson et al. . |
| 5,173,747 | 12/1992 | Bolarski et al. . |
| 5,253,037 | 10/1993 | Klainer et al. . |
| 5,430,817 | 7/1995 | Vengsarkar . |
| 5,485,277 | 1/1996 | Foster . |
| 5,492,840 | 2/1996 | Malmqvist et al. . |
| 5,641,956 | 6/1997 | Vengsarkar et al. ................ 250/227.14 |
| 5,646,400 | 7/1997 | Perez et al. ......................... 250/227.18 |
| 5,647,039 | 7/1997 | Judkins et al. ............................. 385/37 |
| 5,864,641 | 1/1999 | Murphy et al. ............................ 385/12 |

OTHER PUBLICATIONS

V. Bhatia et al., "Optical Fiber Long–Period Grating Sensors," *Lightnews*, Winter 1995, pp. 6–11.

K. O. Hill et al., "Photosensitivity in Optical Fiber Waveguides: Application to Reflection Filter Fabrication," *Appl. Phys. Lett.*, 32(10), May 15, 1978, pp. 647–649.

T. A. Tran et al., "Real–time immunoassays using fiber optic long–period grating sensors," *Biomedical Sensing, Imaging, and Tracking Technologies I*, Proceedings SPIE—The International Society for Optical Engineering, R. A. Lieberman et al., Eds., vol. 2676, Jan. 29–31, 1996, pp. 165–170.

A. M. Vengsarkar et al., "Long–Period Fiber Gratings as Gain–Flattening and Laser Stabilizing Devices," *Tenth International Conference on Integrated Optics and Optical Fibre Communication*, vol. 5, Jun. 26–30, 1995, pp. 3–4.

A. M. Vengsarkar et al. "Long–Period Fiber Gratings as Band–Rejection Filters," *Jorunal of Lightwave Technology*, vol. 14, No. 1, Jan. 1996, pp. 58–65.

A. M. Vengsarkar et al., "Long–Period Cladding–Mode––Coupled Fiber Gratings: Properties and Applications," *1995 Technical Digest Series*, vol. 22, Sep. 9–11, 1995, pp. SaB2–1—SaB2–4.

A. M. Vengsarkar et al., "Long–Period Gratings as Band-Rejection Filters," *OFC '95*, Feb. 26–Mar. 3, 1995, pp. PD4–1 —PD4–5.

E. Stenberg et al., "Quantitative Determination of Surface Concentration of Protein with Surface Plasmon Resonance Using Radiolabeled Proteins," *Journal of Colloid and Interface Science*, vol. 143, No. 2, May 1991, pp. 513–526.

L. De Maria et al., "Fiber–optic sensor based on surface plasmon interrogation," *Sensors and Actuators*, B. 12, Dec. 21, 1992, pp. 221–223.

R. C. Jorgenson et al., "A Fiber–optic chemical sensor based on surface plasmon resonance," *Sensors and Actuators*, B. 12, Dec. 20, 1992, pp. 213–220.

G. P. Anderson et al., "Evelopment of an Evanescent Wave Fiber Optic Biosensor," *IEEE Engineering in Meicine and Biology*, Jun./Jul. 1994, pp. 358–363.

Frances S. Ligler et al., "The Antibody–Based Biosensor: A Technology for Today," *Navel Research Reviews*, Three 1994, pp. 13–17.

*Primary Examiner*—John D. Lee
*Assistant Examiner*—Victoria D. Hao
*Attorney, Agent, or Firm*—Joy L. Bryant

[57] ABSTRACT

An optical sensor having at least one long period grating disposed within an optical waveguide is provided. The optical waveguide has a refractive index profile. The long period grating has a plurality of index perturbations spaced apart by a periodic distance $\Lambda$. The long period grating promotes an excitation of confined propagating broadband light into higher order modes that excite a sensing mechanism. The excitation of confined propagating broadband light is spectrally dependent on the periodic distance of the long period grating and the refractive index profile of the optical waveguide.

14 Claims, 7 Drawing Sheets

OPTICAL SENSOR ACTIVATION DEVICE

FIELD OF THE INVENTION

The present invention relates to optical sensors. In particular, it relates to an optical sensor comprising an optical waveguide and at least one long period grating.

BACKGROUND OF THE INVENTION

Optical sensing approaches for biological and chemical measurements have generally relied on fluorescence and surface plasmon resonance (SPR) techniques. Non-optical based sensors are far less sensitive than SPR sensors, and employ radiolabeled and fluorescently labeled proteins in immunoassay formats. The reduced sensitivity of the non-optical sensors creates measurement inaccuracies and requires more tightly-controlled testing environments.

Contemporary bulk SPR-based techniques are difficult to transition into a mobile platform because critical component alignments cannot be maintained in a field environment. Impractical size and weight ramifications are necessary to "ruggedize" current systems. Attempts to solve this dilemma have resulted in the creation of portable sensing systems through the construction of optical fiber versions of both SPR and optical fluorescence systems. These devices, however, are severely limited. In both the "ruggedized" and the portable sensing scenarios, time-consuming and expensive manufacturing processes are required.

Jorgenson et al., (R. C. Jorgenson and S. S. Yee, "A Fiber-Optic Chemical Sensor Based On Surface Plasmon Resonance", *Sensors and Actuators B,* volume 12, pages 213–220, 1993), demonstrated an SPR approach in a fiber optic configuration. Their approach involved a fiber-optic SPR sensing configuration that did not require a light-coupling prism. They disclose the sensing element as a segment of fiber in which the cladding has been removed and a 550 Å thick silver film has been symmetrically deposited on the fiber core, via electron-beam evaporation. Removal of the cladding enables the light to interact with the metallic layer.

Frances Ligler et al., (Frances S. Ligler, Lisa C. Shriver-Lake, Joel P.

Golden, and George P. Anderson, "The Antibody-Based Biosensor: A Technology For Today", *Naval Research Reviews,* vol. 46, 3: 13–17, 1994) employed long optical fibers as a detection means that could easily be manipulated into various sample containers. They removed the plastic cladding to fabricate the sensing region before antibodies were attached and the fiber immersed in the sample. As fluorescent light returns up the fiber, it passes from the unclad region of the fiber into the clad region of the fiber. The antibodies were used to capture dye-marked targets, with the returning fluorescent signal indicating target strength. It was found, however, that much of the emitted light was lost into the cladding, thus necessitating changing the geometry of the fiber. Ligler et al. tapered the fiber to enhance both the distribution of the excitation light throughout the length of the probe region and the preservation of the returning fluorescent signal. This probe uses light propagating in the tapered region of the optical fiber to produce an evanescent field extending into the coating.

Anderson et al., (George P. Anderson, Joel P. Golden, Lynn K. Cao, Daya Wijesuriya, Lisa C. Shriver-Lake, and Francis S. Ligler, "Development of an Evanescent Wave Fiber Optic Biosensor", IEEE Engineering in Medicine and Biology, 358–363, June/July 1994), disclosed a fiber optic biosensor where several centimeters of cladding area are removed along the fiber's distal end. Recognition antibodies are immobilized on the exposed core surface. These antibodies bind fluorophore-antigen complexes within the interaction region of the evanescent wave. The evanescent wave effectively penetrates less than a wavelength beyond the core into the surrounding medium and is what excites the fluorescent molecules in complexes bound to the surface of the waveguide core. The resulting fluorescence couples into the cladded core of the immersed optical fiber. This immersed probe functions as a dielectric waveguide with the aqueous buffer as the cladding medium. The fluorescent signal generated within the probe is then transmitted to the fluorimeter through the clad fiber. They further disclosed that the primary difficulty in utilizing the core surface as the sensing region is that removing the cladding causes an abrupt disturbance in the dielectric structure of the optical fiber. Because the immersed core supports more modes than the clad fiber, some of the fluorescent signal is lost upon entry into the clad fiber.

Compounding this difficulty, fluorescence coupling from outside the core propagates primarily in the highest-order modes available, thus exacerbating signal loss from V-number mismatch. To solve this problem, Anderson et al. provided a combination tapered probe by removing the buffer and most of the cladding from the distal end of the fiber. This created a probe that tapered from the original radius rapidly down to a V-number matching radius, while maintaining total internal reflection. They note that it is critical that the probe be reduced to the V-number matching radius to ensure that fluorescence entering the fiber probe will be captured in modes that also propagate in the clad fiber.

The primary failure of this sensor is that the physical dimensions of the optical fiber must be altered to effectively excite the sensing mechanism. Etching techniques usually involve exposing an optical fiber to a chemical bath for a set period, followed by a stop bath, thus etching away a significant portion of the cladding and producing a brittle structure through the removal of protective buffer coatings, reduction of fiber diameter, adverse handling of exposed unprotected fiber, and increased probability of microcracks. Furthermore, the process of precise uniform etching of optical fibers is tedious, time-consuming, involves hazardous materials, and is not cost-effective for mass produced devices.

Tapering of an optical fiber creates similar problems. One method of tapering an optical fiber involves securing the fiber at two discrete locations. The fiber is then exposed to a localized high temperature perturbation, such as a propane torch, to soften the optical fiber. As the glass structure melts, the optical fiber is simultaneously pulled by opposing forces, resulting in a tapered reduction of the fiber diameter.

Etching and tapering of optical fibers is difficult to control and results in a weakened sensing element. Prior methods have required these steps to either excite an SPR wave in a metallic layer on the fiber or create an evanescent wave to excite captured targets dyed with fluorescent material. The present invention, does not require etching or tapering of an optical fiber. Rather, it utilizes a long period grating to excite confined propagating broadband light into higher order modes which causes an excitation of a sensing mechanism such as an SPR wave or a bound fluorescent material. This yields tremendous advantages because long period gratings may be produced cost-effectively, in large volumes, and without causing any degradation in fiber strength.

An object of the present invention is to provide an optical sensor that does not require etching or tapering of the waveguide.

Another object of the present invention is to provide an optical sensor having at least one long period grating that promotes an excitation of confined propagating broadband light into higher order modes which causes an excitation of a sensing mechanism.

Another object of the present invention is to provide an optical sensor having at least one pair of long period gratings disposed within an optical waveguide where the first long period grating promotes excitation of broadband light into higher order modes causing an excitation of a sensing mechanism where the second long period grating then directs light back into the optical waveguide.

SUMMARY OF THE INVENTION

By the present invention, an optical sensor is provided. The optical sensor comprises an optical waveguide having a refractive index profile. At least one long period grating is disposed within the optical waveguide. The long period grating has a plurality of index perturbations spaced apart by a periodic distance $\Lambda$. The long period grating promotes an excitation of confined propagating broadband light into higher order modes and this excitation is spectrally dependent on the periodic distance of the long period grating and the refractive index profile of the optical waveguide. The light in the higher order modes causes an excitation of a sensing mechanism.

In another embodiment, an optical sensor comprises an optical waveguide having a refractive index profile and at least one pair of long period gratings disposed within the optical waveguide. The pair of long period gratings comprises first and second long period gratings placed in an operable relationship with each other. Each long period grating has a plurality of index perturbations spaced apart by a periodic distance $\Lambda$. The first long period grating promotes an excitation of confined propagating broadband light into higher order modes. The light in the higher order modes causes an excitation of a sensing mechanism. The second long period grating directs light back into the waveguide.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

The sensors of the present invention provide an increase in sensitivity over those of the prior art, yet do not require the alteration of the physical dimensions of an optical fiber. Because the coupling wavelength of these sensors is dependent upon the grating periodicity, the sensors of the present invention may be designed at various wavelengths and demodulated using standard wavelength division multiplexing techniques. The optical sensors of the present invention may be used in the optical waveguide sensor arrangements described by Vengsarkar et al. in U.S. Pat. No. 5,641,956 the disclosure of which is hereby incorporated by reference. Additionally, the manufacturing processes employed to produce the sensors of the present invention are more efficient, accurate, and economic than current processes.

Figure 1:
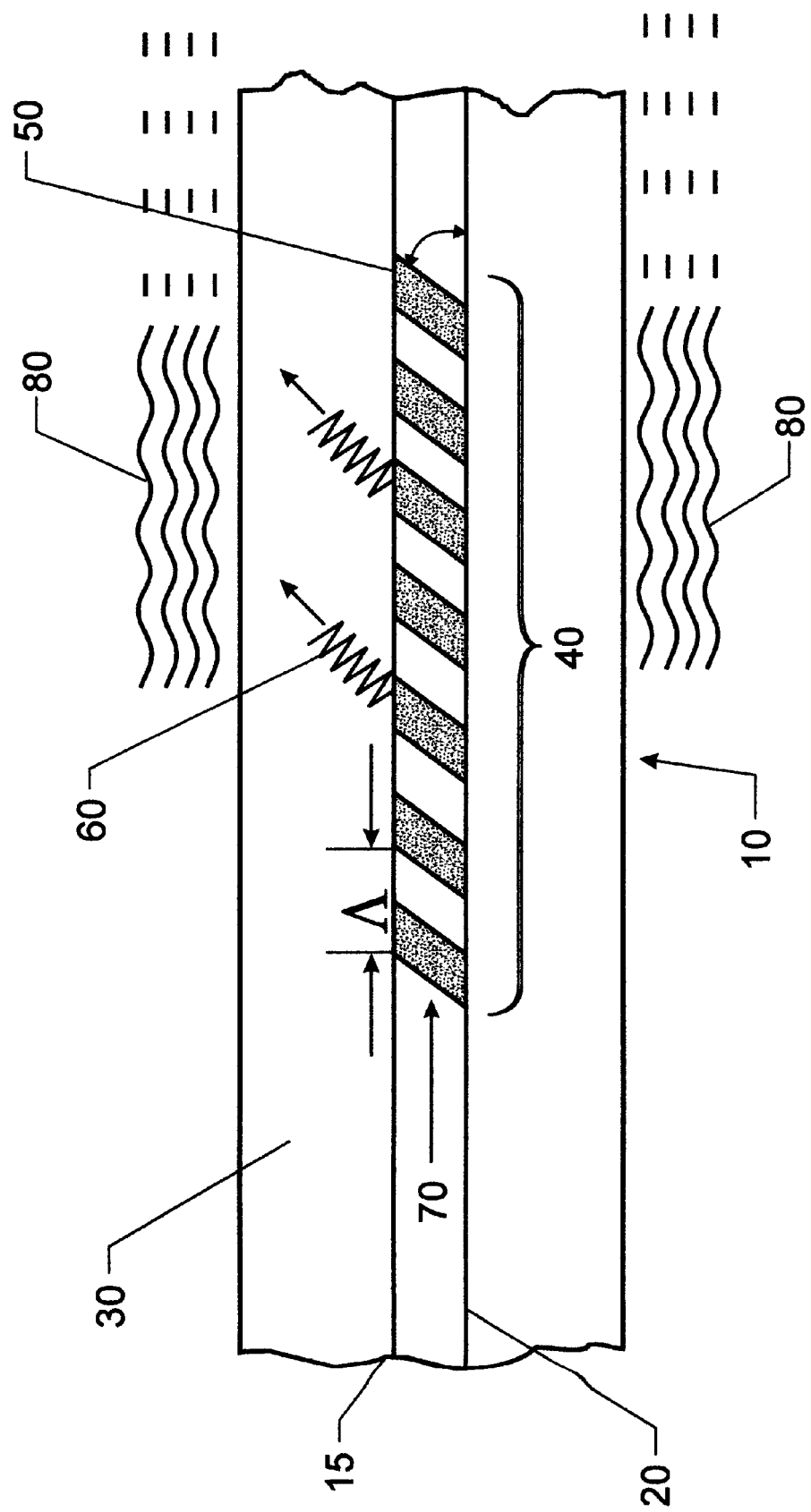
FIG. 1 is a schematic cross-section of an optical waveguide sensor having a long period grating disposed therein.

Referring now to the drawings, FIG. 1 is a schematic cross-section of an optical sensor 10. For simplicity, the optical waveguide 15 shown is a fiber optic waveguide although, the optical waveguide 15 may be any optical waveguide known to those skilled in the art, such as: a planar optical waveguide or an integrated optic waveguide. The fiber optic waveguide core 20 is surrounded by a cladding 30 and includes one or more long period gratings 40. Each long period grating 40 has a plurality of index perturbations 50 spaced apart by a periodic distance $\Lambda$. The periodic distance $\Lambda$ may be either regular or irregular and is typically within the range: 10 $\mu$m $\leq\Lambda\leq$ 1500 $\mu$m. When in use, the long period grating 40 promotes an excitation of confined propagating broadband light 70 into higher order modes 60. This excitation is spectrally dependent on the periodic distance $\Lambda$ of the long period grating 40 and the refractive index profile of the optical waveguide 15. The light in the higher order modes 60 excite a sensing mechanism 80. The sensing mechanism 80 is any sensing mechanism known to those skilled in the art and in particular is: an absorption mechanism; a polarization mechanism; a phase changing mechanism; an electromagnetic property changing mechanism; or a fluorescent signal.

Figure 2:
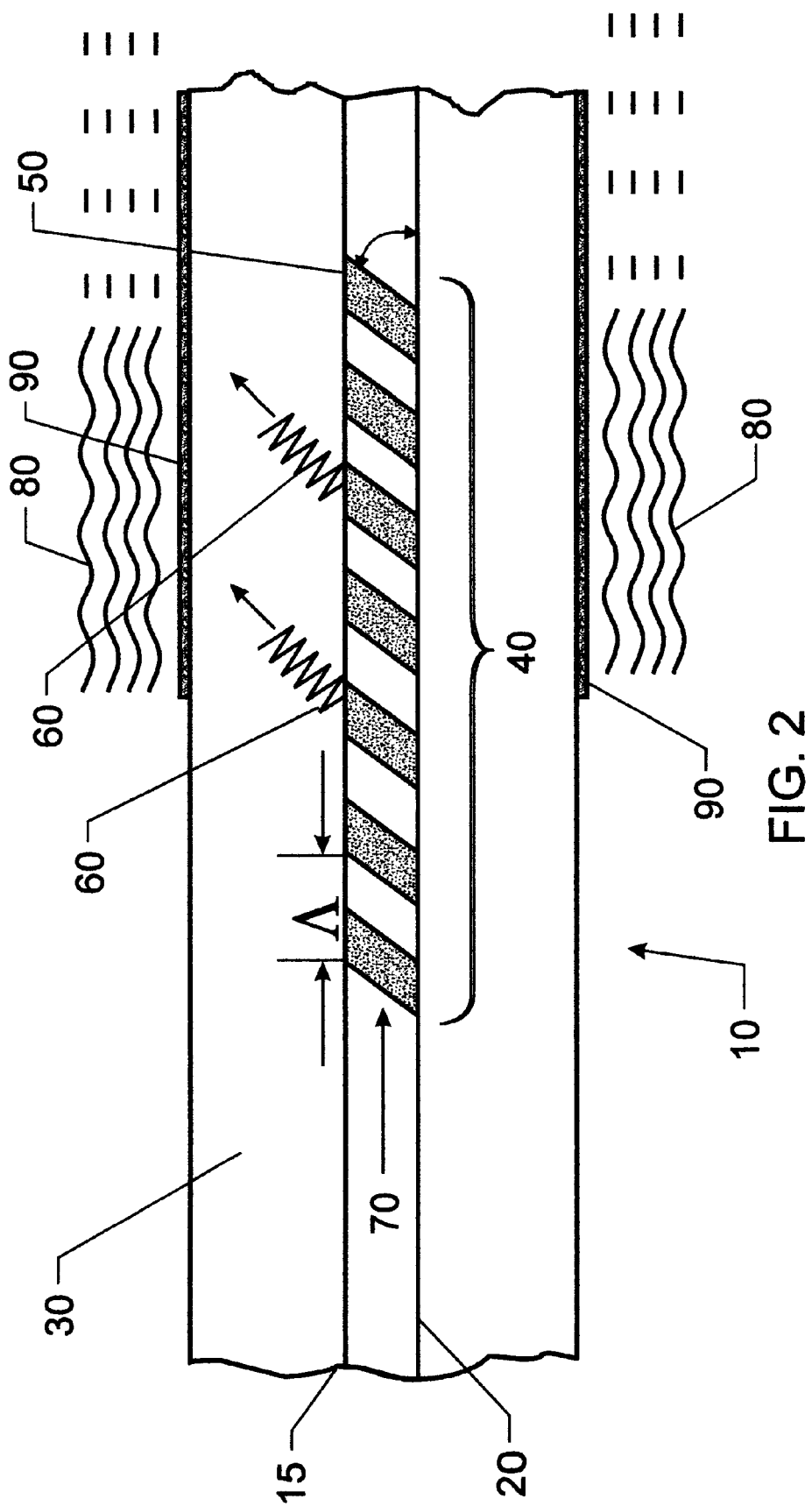
FIG. 2 is a schematic cross-section of an optical waveguide sensor having a long period grating disposed therein and a coating disposed on the optical waveguide in an operable relationship to the long period grating.

FIG. 2 depicts an optical sensor 10 having a coating 90 disposed on the optical waveguide 15. The coating 90 is placed in an operable relationship to the long period grating 40. This operable relationship is such that, when in use, the long period grating 40 promotes an excitation of confined propagating broadband light 70 into higher order modes 60 thus exciting a sensing mechanism 80. The optical wave guide coating 90 increases the sensitivity of the sensing mechanism 80 and may be any coating known to those skilled in the art, such as: a fluorescent coating, a metallic coating, or a reactive coating. Examples of various reactive coatings are described in copending patent application Ser. No. 08/838,873 filed Apr. 11, 1997 by Kent A. Murphy et al. (now U.S. Pat. No. 5,864,641), the disclosure of which is hereby incorporated by reference. For surface plasmon resonance (SPR) techniques, the light in the higher order modes is used to excite a surface plasmon wave sensing mechanism in a metallic coating disposed on the optical waveguide. For fluorescent techniques, the light in the higher order modes excites a fluorescent signal sensing mechanism in a fluorescent coating. The fluorescent coating material may be any fluorescent coating known to those skilled in the art and, in particular, it may be an affinity coating or any coating that captures fluorescent dyed material. Furthermore, a fluorescent signal may result when the optical sensor comes into contact with a free-floating fluorescent material in the medium or any external environment that fluoresces.

Figure 3:
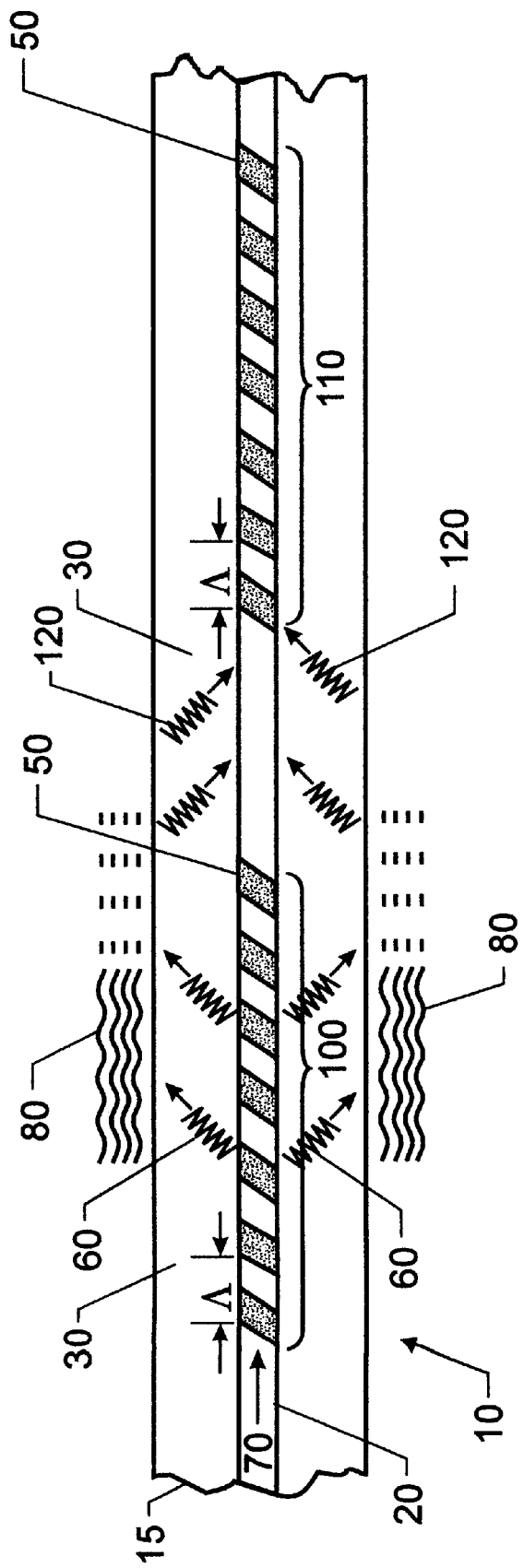
FIG. 3 is a schematic cross-section of an optical waveguide sensor having a pair of long period gratings disposed therein.

FIG. 3 is a schematic cross-section of an optical sensor comprising an optical waveguide having a pair of long period gratings disposed therein. As in FIG. 1, the optical sensor 10 shown in FIG. 3 depicts a preferred embodiment which is a fiber optic waveguide 15. However, the optical waveguide may also be a planar optical waveguide or an integrated optic waveguide. The fiber optic waveguide core 20 is surrounded by a cladding 30 and includes one or more pairs of long period gratings 100, 110 disposed therein and placed in an operable relationship to each other. Each long period grating 100, 110 has a plurality of index perturbations 50 spaced apart by a periodic distance Λ. The periodic distance Λ may be either regular or irregular and is typically within the range: 10 $\mu m \leq \Lambda \leq 1500$ $\mu m$. The operable relationship is such that the first long period grating 100 promotes an excitation of confined propagating broadband light 70 into higher order modes 60. The light in the higher order modes excites a sensing mechanism 80. The sensing mechanism 80 is any sensing mechanism known to those skilled in the art and is preferably an absorption mechanism; a polarization mechanism; a phase changing mechanism; an electromagnetic property changing mechanism; or a fluorescent signal. The second long period grating 110 is positioned with respect to the first long period grating 100 such that light is coupled back into propagating modes 120. The excitation of the broadband light 70 into higher order modes 60 and the subsequent coupling of light back into propagating modes 120 are spectrally dependent on the periodic distance Λ of each pair of long period gratings 100, 110 and the refractive index profile of the optical waveguide 15.

Figure 4:
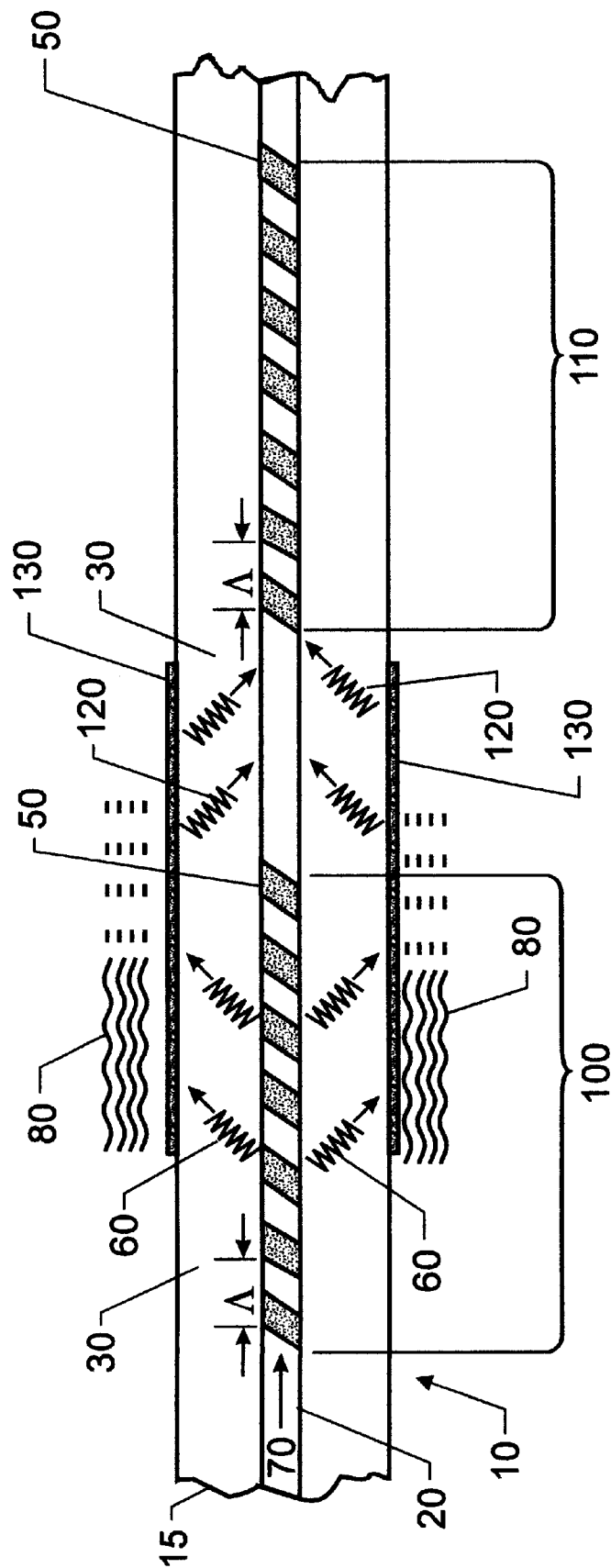
FIG. 4 is a schematic cross-section of an optical waveguide sensor having a pair of long period gratings disposed therein and a coating disposed on the optical waveguide in an operable relationship to the pair of long period gratings.

FIG. 4 is a schematic cross-section of a preferred optical sensor 10 which is used for fluorescent techniques. The fiber optic waveguide 15 has a pair of long period gratings 100, 110 disposed therein and a fluorescent coating 130 disposed on the optical waveguide 15 in an operable relationship to the pair of long period gratings 100, 110. This relationship is such that the first long period grating 100 promotes an excitation of confined propagating broadband light 70 into higher order cladding modes 60. The light in the higher order modes excites a fluorescent sensing mechanism 80. The fluorescent coating 130 increases the sensitivity of the sensing mechanism 80 through the binding of captured molecules tagged with a fluorescent dye. The second long period grating 110 couples the fluorescent signal 80 back into a propagating mode 120 whose boundary conditions minimize transmission loss.

EXAMPLE

Long period gratings (LPGs) are based upon the phase-matching condition between the guided modes in an optical waveguide. Light launched in the waveguide core interacts with the long period grating and is converted into a number of modes contained within the waveguide cladding through the excitation of broadband light into higher-order cladding modes. The light that is coupled has an absorption band whose width is dependent upon fiber and grating parameters. For surface plasmon resonance (SPR) techniques, these higher-order cladding modes are used to excite the surface plasmon waves in a metallic layer coated on the waveguide. In the fluorescent scheme, a second long period grating whose period corresponds to the fluorescent wavelength is used to couple the sensing signal back into a propagating mode whose boundary conditions minimize transmission loss.

Figure 5A:
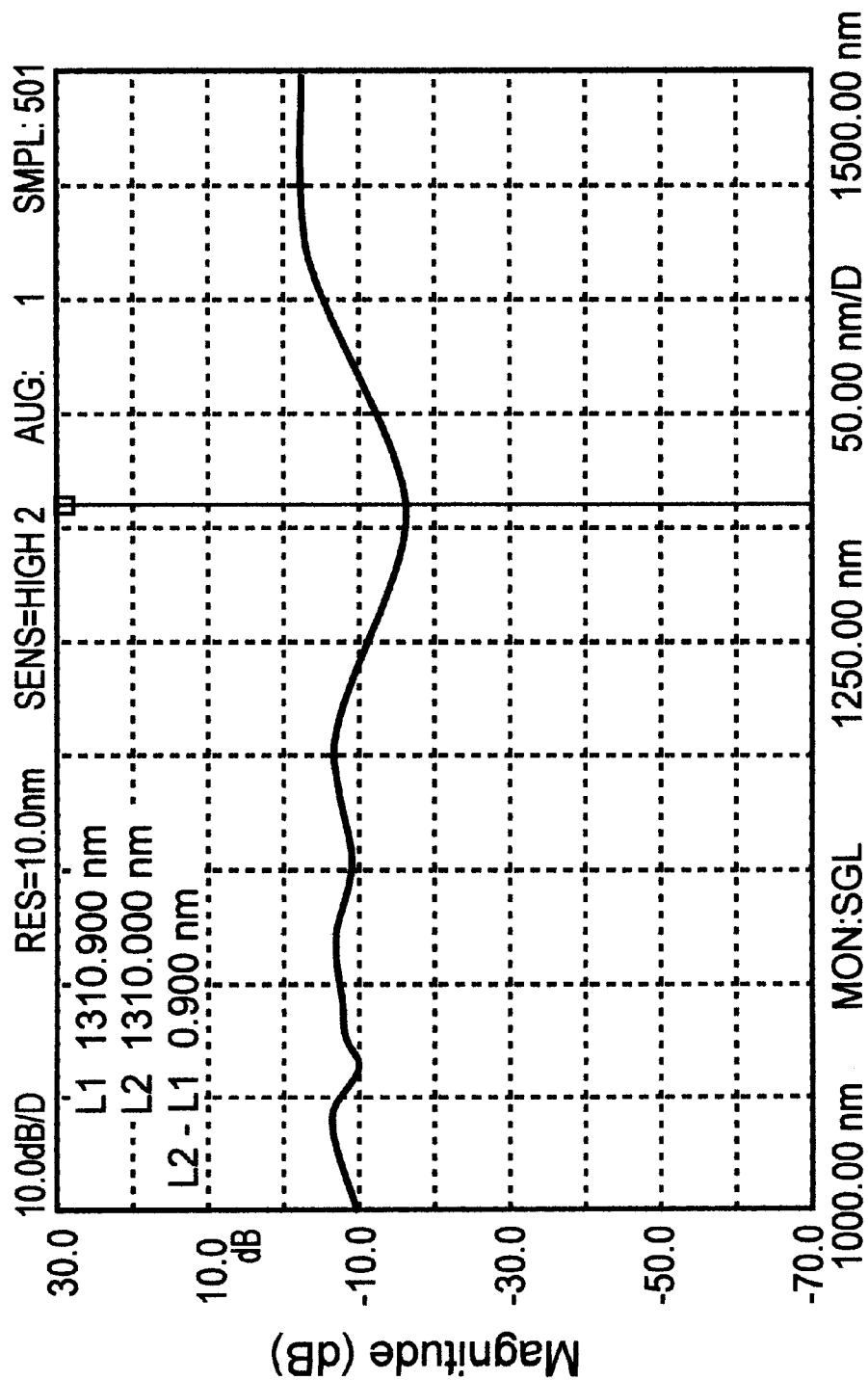
FIGS. 5A–C are the spectral profiles of long period gratings having three different periodicities.
Figure 5B:
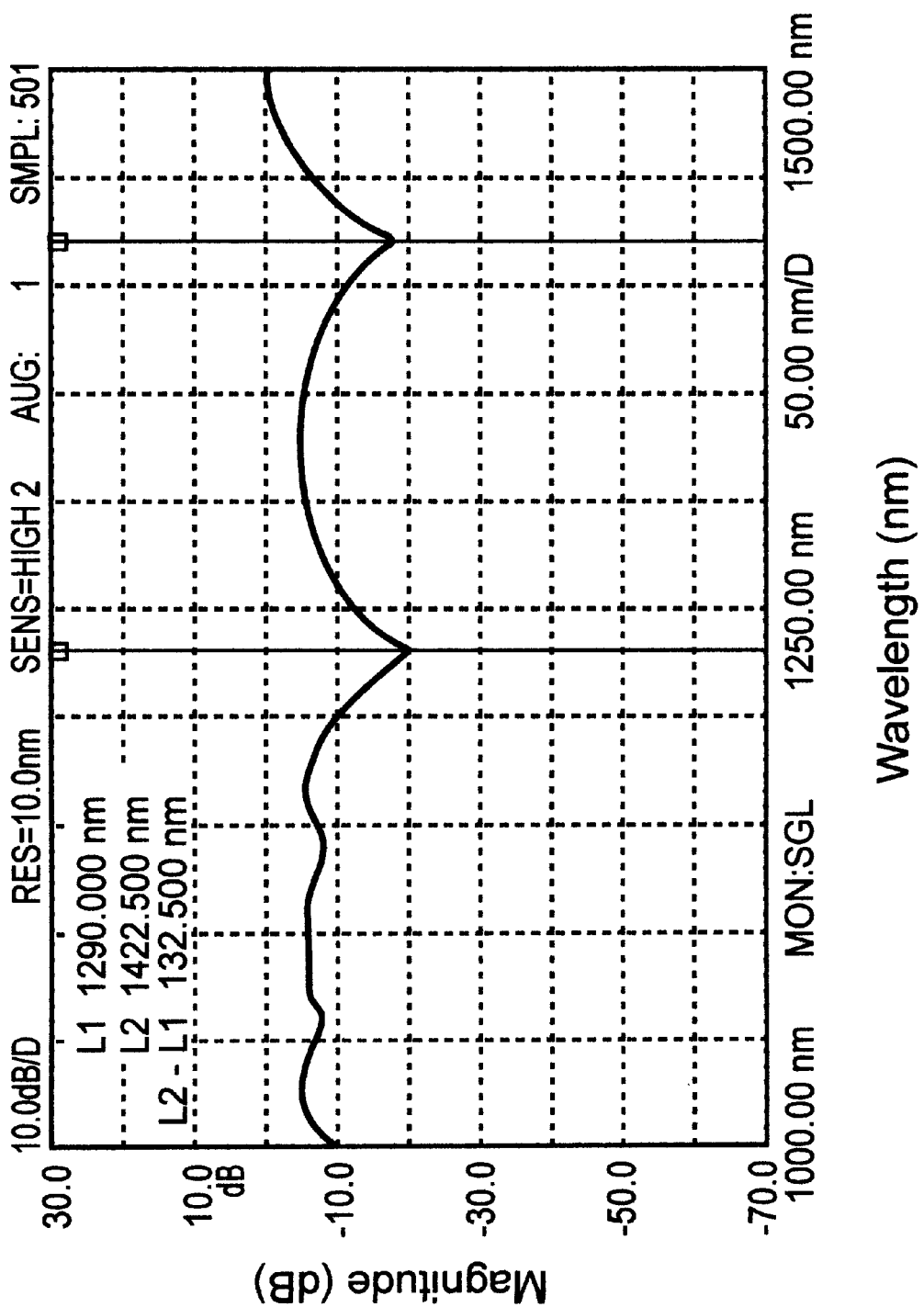
Figure 5C:
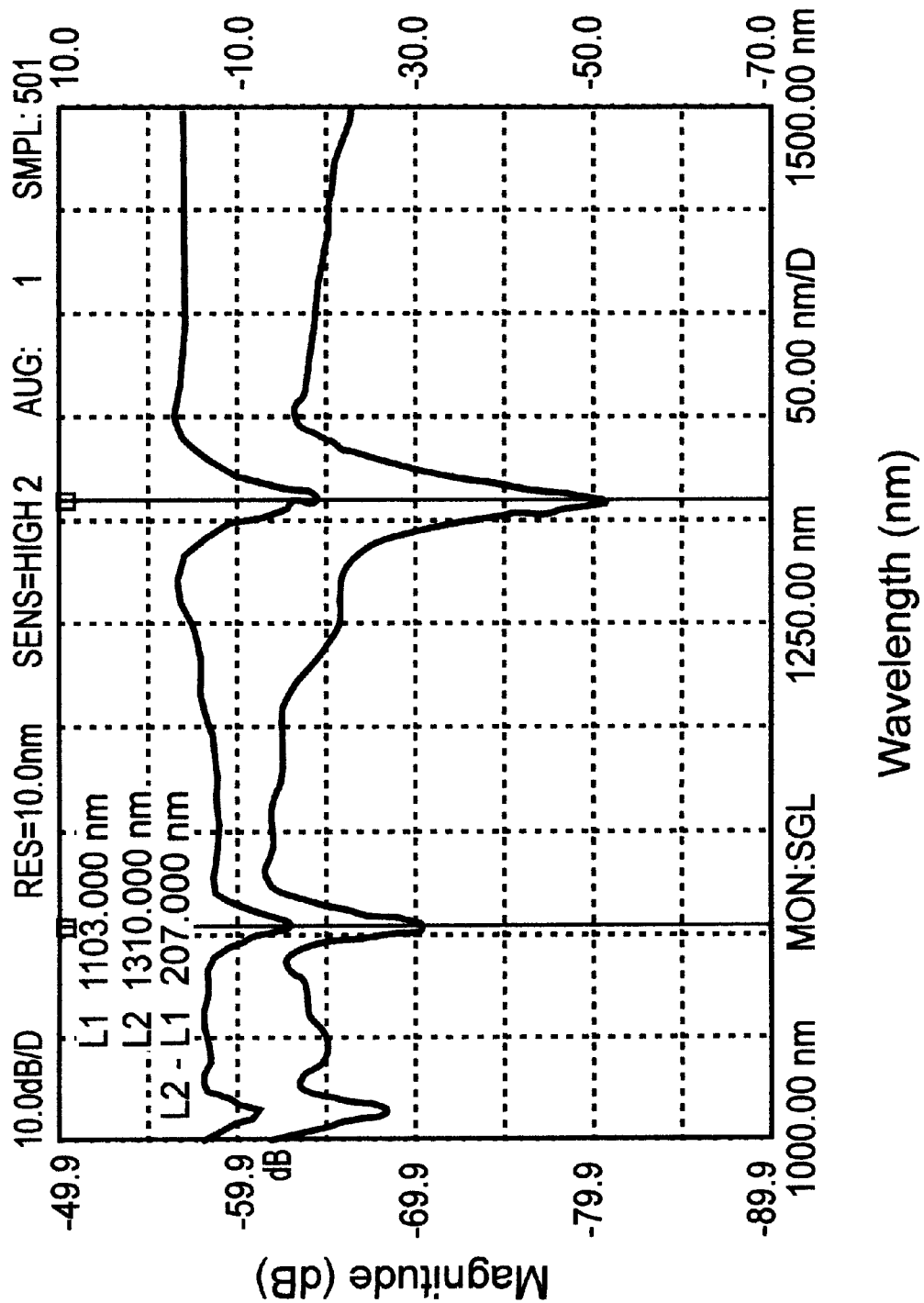

The spectral width of the LPG is controlled by: the length of the LPG; varying the period of index discontinuity; multiplexing several LPGs at different periodicities; or choosing the proper LPG period so that the group indices of the core and guided modes are properly balanced. FIGS. 5A–C shows three different LPGs with three different spectral widths. The multiple troughs correspond to coupling into different cladding modes.

The spectral location of the coupling band is a function of the difference in the effective indices of the guided mode and the corresponding cladding mode. Specifically, the coupling wavelength λ for a particular resonance band is given by the expression: $\lambda = (n_g - n_{cl})\Lambda$; where Λ is the grating period, and $n_g$ and $n_{cl}$ are respectively the effective indices of the guided and cladding modes that are a function of the fiber parameters. The location of the spectral coupling is precisely controlled. This advantageous result may be exploited by simultaneously exciting numerous fluorescent materials, or multiplexing variable SPR signals.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:
1. An optical sensor comprising:
an optical waveguide;
at least one pair of long period gratings disposed within the optical waveguide, wherein the pair of long period gratings comprises first and second long period gratings placed in an operable relationship with each other, each long period grating has a plurality of index perturbations spaced apart by a periodic distance Λ;
wherein the first long period grating promotes an excitation of confined propagating broadband light into higher order modes wherein the light in the higher order modes causes an excitation of a sensing mechanism; and
wherein the second long period grating directs light back into the optical waveguide.
2. An optical sensor according to claim 1, wherein the periodic distance is irregular.
3. An optical sensor according to claim 2, wherein the periodic distance is 10 $\mu m \leq \Lambda \leq 1500$ $\mu m$.
4. An optical sensor according to claim 1, wherein the periodic distance is 10 $\mu m \leq \Lambda \leq 1500$ $\mu m$.
5. An optical sensor according to claim 1, wherein the sensing mechanism is a fluorescent signal.
6. An optical sensor according to claim 1, wherein the optical waveguide is selected from the group consisting of a planar optical waveguide; an integrated optic waveguide; and a fiber optic waveguide.
7. An optical sensor according to claim 6, wherein the optical waveguide is a fiber optic waveguide.
8. An optical sensor according to claim 1, further comprising a fluorescent coating disposed on the optical waveguide and positioned in an operable relationship to each pair of long period gratings.
9. An optical sensor comprising:
a fiber optic waveguide having a refractive index profile;
at least one long period grating disposed within the fiber optic waveguide, wherein the long period grating has a plurality of irregular index perturbations spaced apart by a periodic distance Λ where: 10 $\mu m \leq \Lambda \leq 1500$ $\mu m$;
a metallic coating disposed on the fiber optic waveguide and positioned in an operable relationship to the long period grating, wherein the long period grating promotes an excitation of confined propagating broadband light into higher order modes; wherein the excitation of broadband light is spectrally dependent on the periodic distance of the long period grating and the refractive index profile of the fiber optic waveguide; and wherein the light in the higher order modes excites a surface plasmon wave.

10. An optical sensor comprising:

a fiber optic waveguide having a refractive index profile;

at least one long period grating disposed within the fiber optic waveguide, wherein the long period grating has a plurality of regular index perturbations spaced apart by a periodic distance $\Lambda$ where: $10\ \mu m \leq 79 \leq 1500\ \mu m$;

a metallic coating disposed on the fiber optic waveguide and positioned in an operable relationship to the long period grating, wherein the long period grating promotes an excitation of confined propagating broadband light into higher order modes; wherein the excitation is spectrally dependent on the periodic distance of the long period grating and the refractive index profile of the fiber optic waveguide; and wherein the light in the higher order modes excites a surface plasmon wave in the metallic coating.

11. An optical sensor comprising:

a fiber optic waveguide having a refractive index profile;

at least one pair of long period gratings disposed within the fiber optic waveguide, each pair comprising first and second long period gratings placed in an operable relationship with each other, wherein each long period grating has a plurality of index perturbations spaced apart by a periodic distance $\Lambda$ where $10\ \mu m \leq \Lambda \leq 1500\ \mu m$;

a fluorescent coating placed in an operable relationship to each pair of long period gratings;

wherein the first long period grating promotes an excitation of confined propagating broadband light into higher order modes wherein the light in the higher order modes causes an excitation of a fluorescent signal, wherein the excitation of the fluorescent signal is spectrally dependent on the periodic distance of the first long period grating and the refractive index profile of the fiber optic waveguide; and wherein the second long period grating directs light back into the fiber optic waveguide.

12. An optical sensor comprising:

an optical waveguide having a refractive index profile;

at least one long period grating disposed within the optical waveguide, wherein the long period grating has a plurality of index perturbations spaced apart by a periodic distance $\Lambda$, wherein the long period grating promotes an excitation of confined propagating broadband light into higher order modes, wherein the excitation of confined propagating broadband light is spectrally dependent on the periodic distance of the long period grating and the refractive index profile of the optical waveguide;

a fluorescent coating disposed on the optical waveguide and positioned in an operable relationship to the long period grating; and wherein the light in the higher order modes causes an excitation of a sensing mechanism.

13. An optical sensor comprising:

an optical waveguide having a refractive index profile;

at least one long period grating disposed within the optical waveguide, wherein the long period grating has a plurality of index perturbations spaced apart by a periodic distance $\Lambda$, wherein the long period grating promotes an excitation of confined propagating broadband light into higher order modes, wherein the excitation of confined propagating broadband light is spectrally dependent on the periodic distance of the long period grating and the refractive index profile of the optical waveguide;

a metallic coating disposed on the optical waveguide and positioned in an operable relationship to the long period grating; and wherein the light in the higher order modes causes an excitation of a sensing mechanism.

14. An optical sensor according to claim 13, wherein the sensing mechanism is a surface plasmon wave.

* * * * *